US011356265B2

(12) United States Patent
Troia et al.

(10) Patent No.: US 11,356,265 B2
(45) Date of Patent: *Jun. 7, 2022

(54) SECURE COMMUNICATION BETWEEN A VEHICLE AND A REMOTE DEVICE

(71) Applicant: Micron Technology, Inc., Boise, ID (US)

(72) Inventors: Alberto Troia, Munich (DE); Antonino Mondello, Messina (IT)

(73) Assignee: Micron Technology, Inc., Boise, ID (US)

( * ) Notice: Subject to any disclaimer, the term of this patent is extended or adjusted under 35 U.S.C. 154(b) by 4 days.

This patent is subject to a terminal disclaimer.

(21) Appl. No.: 16/990,486

(22) Filed: Aug. 11, 2020

(65) Prior Publication Data
US 2020/0374123 A1 Nov. 26, 2020

Related U.S. Application Data

(63) Continuation of application No. 16/362,814, filed on Mar. 25, 2019, now Pat. No. 10,749,680.

(51) Int. Cl.
*H04L 9/32* (2006.01)
*H04L 9/08* (2006.01)
(Continued)

(52) U.S. Cl.
CPC ............ *H04L 9/3226* (2013.01); *B60R 25/24* (2013.01); *H04L 9/0861* (2013.01);
(Continued)

(58) Field of Classification Search
CPC ... H04L 9/3226; H04L 9/0861; H04L 9/3247; H04L 9/3268; B60R 25/24; B60R 2325/108
See application file for complete search history.

(56) References Cited

U.S. PATENT DOCUMENTS

| 5,363,448 A | 11/1994 | Koopman et al. |
| 10,553,058 B2 | 2/2020 | Troia et al. |

(Continued)

OTHER PUBLICATIONS

U.S. Appl. No. 15/853,498, entitled, "Physical Unclonable Function Using Message Authentication Code", filed Dec. 22, 2017, 28 pages.

(Continued)

*Primary Examiner* — Nabil H Syed
(74) *Attorney, Agent, or Firm* — Brooks, Cameron & Huebsch, PLLC

(57) ABSTRACT

The present disclosure includes secure communication between a vehicle and a remote device. An embodiment includes a processing resource, memory, and a vehicular communication component configured to, in response to receiving a request from a remote communication component to switch a state of a lock, calculate a challenge count for the request, generate a vehicular private key and a vehicular public key, perform a number of verification iterations, each respective verification iteration including providing the public key to the remote communication component, receiving, from the remote communication component, code for switching the lock state, verifying the remote communication component's identity, and incrementing a counter in response to verifying the remote communication component's identity, and decrypt the code using the private key and switch the lock state in response to the counter being incremented to a value equal to or greater than the challenge count.

20 Claims, 9 Drawing Sheets

(51) Int. Cl.
  *B60R 25/24*    (2013.01)
  *G06F 7/58*    (2006.01)
  *H04W 4/40*    (2018.01)

(52) U.S. Cl.
  CPC .......... *H04L 9/3247* (2013.01); *H04L 9/3268* (2013.01); *B60R 2325/108* (2013.01); *G06F 7/588* (2013.01); *H04L 2209/80* (2013.01); *H04L 2209/84* (2013.01); *H04W 4/40* (2018.02)

(56) References Cited

U.S. PATENT DOCUMENTS

| | | | |
|---|---|---|---|
| 10,579,998 | B1 | 3/2020 | Newman et al. |
| 2001/0054147 | A1* | 12/2001 | Richards ............... H04L 9/3271 713/172 |
| 2009/0136035 | A1* | 5/2009 | Lee ................... G07C 9/00309 380/270 |
| 2020/0052905 | A1* | 2/2020 | Mathias ................ H04L 9/0861 |

OTHER PUBLICATIONS

U.S. Appl. No. 16/201,652, entitled, "Parking Infrastructure Powered by a Decentralized, Distributed Database", filed Nov. 27, 2018, 27 pages.

U.S. Appl. No. 15/993,119, entitled, "Transmission of Vehicle Route Information by Passive Devices", filed May 30, 2018, 25 pages.

U.S. Appl. No. 16/034,763, entitled, "Secure Vehicular Communication", filed Jul. 13, 2018, 37 pages.

U.S. Appl. No. 16/034,809, entitled, "Secure Vehicular Services Communication", filed Jul. 13, 2018, 36 pages.

PCT International Application No. PCT/IB2019/000089, entitled, "Method for Improving Safety of a Component or System Running a Firmware or a Finite State Machine", filed Feb. 22, 2019, 42 pages.

U.S. Appl. No. 16/023,309, entitled, "Secure Wireless Lock-Actuation Exchange", filed Jun. 29, 2018, 36 pages.

* cited by examiner

SECURE COMMUNICATION BETWEEN A VEHICLE AND A REMOTE DEVICE

PRIORITY INFORMATION

This application is a Continuation of U.S. application Ser. No. 16/362,814, filed on Mar. 25, 2019, which will issue as U.S. Pat. No. 10,749,680 on Aug. 18, 2020, the contents of which are incorporated herein by reference.

TECHNICAL FIELD

The present disclosure relates generally to vehicles, and more particularly, to secure communication between a vehicle and a remote device.

BACKGROUND

Wireless mechanisms have been employed in a variety of products, including, for example, vehicle locking mechanisms (e.g., unlocking a car door, opening a trunk, starting the engine, etc.). In such products, a paring between a remote device (e.g., a signaler such as a wireless key-fob) and the vehicle (e.g., the locking mechanism of the vehicle) can be used to add security to the process.

Threats from hackers or other malicious users, however, can affect the security of the communication between the remote device and the vehicle. Such threats can include man-in-the-middle (MITM) attacks, among others, and can cause significant financial loss and/or present significant safety and/or security issues. For instance, a hacker or other malicious user can use an MITM attack to gain unauthorized access to (e.g., break into and/or steal) a vehicle.

DETAILED DESCRIPTION

Figure 1:
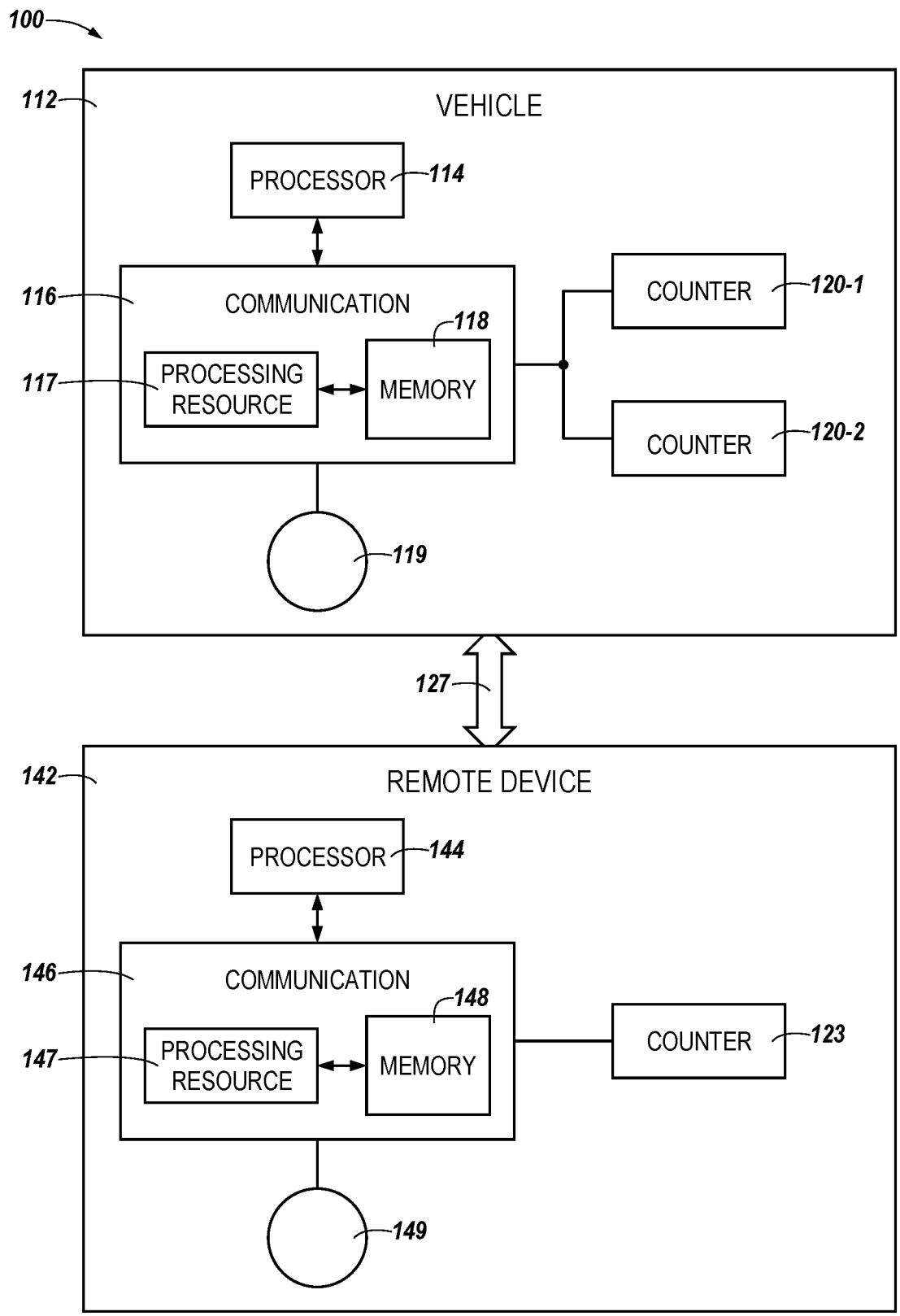
FIG. 1 is a block diagram of a system for secure communication between a vehicle and a remote device in accordance with an embodiment of the present disclosure.

The present disclosure includes apparatuses, methods, and systems for secure communication between a vehicle and a remote device. An embodiment includes a processing resource, memory, and a vehicular communication component configured to, in response to receiving a request from a remote communication component to switch a state of a lock, calculate a challenge count for the request, generate a vehicular private key and a vehicular public key, perform a number of verification iterations, each respective verification iteration including providing the public key to the remote communication component, receiving, from the remote communication component, code for switching the lock state, verifying the remote communication component's identity, and incrementing a counter in response to verifying the remote communication component's identity, and decrypt the code using the private key and switch the lock state in response to the counter being incremented to a value equal to or greater than the challenge count.

Many threats from hackers or other malicious users can affect the security of communication between a remote device (e.g. a wireless key-fob) and a vehicle. For example, a hacker or other malicious user may attempt to perform an activities, such as, for instance, a man-in-the-middle (MITM) attack, to monitor, interfere with, and/or intercept wireless communications between the remote device and the vehicle for malicious purposes. One example of an MITM attack is a replay attack, in which a transmission may be recorded (e.g., using a radio receiver in proximity to the signaler) and then replayed in the future to achieve an unauthorized action. Such hacking activities can cause significant financial loss and/or present significant safety and/or security issues. For instance, a hacker or other malicious user can use an MITM attack to gain unauthorized access to (e.g., break into and/or steal) a vehicle.

As such, it is important to ensure that communications between a remote device and a vehicle are secure, in order to prevent unauthorized recording and replay of communications (e.g., transmissions) as part of an MITM attack. Previous mechanisms used to prevent MITM (e.g., replay) attacks include rolling (e.g., hopping) codes, which can define a sequence of codes that can be stored by the vehicle and the remote device and used in each subsequent communication between the vehicle and remote device. Once a code in the sequence is successfully used, the vehicle and remote device will move on to the next code in the sequence, thereby rendering previously used codes useless.

Rolling codes, however, can be susceptible to a hacking attack, sometimes referred to as a rolljam, in which the attacker actively intervenes in the code exchange between the vehicle and remote device. For instance, in a rolljam attack, the attacker may snoop a communication between the remote device and the vehicle (e.g., an attempt by the user of the key-fob to unlock the vehicle) to obtain a first code from the remote device. The attacker may also jam the wireless link between the remote device and the vehicle (e.g., by broadcasting on the frequency to raise the noise floor above the signal from the remote device), such that the vehicle does not receive the code from the remote device and accordingly does not move forward in the rolling code sequence or unlock. If the remote device attempts to communicate again (e.g., the user of the key-fob again presses the unlock button because the vehicle door did not unlock), the attacker can capture the second code, jam the wireless link again, and transmit the first code to the vehicle. Because the vehicle did not progress in the rolling code sequence when the first code was originally sent from the remote device, the vehicle will accept the first code from the attacker, and progress the sequence to the second code. However, because the attacker now also has the second code, the attacker can transmit the second code to the vehicle at a later time, resulting in an effective unlocking of the vehicle by the attacker.

To address the security problem presented by such a rolljam attack, a secure communication between a vehicle and a remote device is described herein. Such a secure communication can utilize a variable challenge count that enables the vehicle and remote device to verify that a given communication with the other is authorized. Such an approach can effectively prevent a rolljam attack because an attacker can not predict whether a given captured code from the remote device would unlock the vehicle, and thus can not effectively capture a code that will unlock the vehicle in the future.

Further, embodiments of the present disclosure can utilize a device identification composition engine-robust internet of things (DICE-RIOT) protocol to further achieve a secure communication between the vehicle and remote device by guaranteeing, for instance, the mutual authentication of the vehicle and the remote device, the correctness of the message being communicated, the attestation of data stored in the vehicle and remote control, and/or a back-up (e.g., rescue) procedure for unlocking the vehicle using a remediation block. Such a DICE-RIOT protocol can be implemented using the existing circuitry (e.g., the existing hardware and/or firmware) of the vehicle and remote device, without having to add additional (e.g., new) components or circuitry dedicated specifically to the secure communication functionality. As such, embodiments of the present disclosure can achieve a secure communication between the vehicle and remote device without increasing the size, complexity, and/or cost of the vehicle and/or remote device circuitry, and can be compatible with any vehicle or remote device that implements such a DICE-RIOT protocol.

As used herein, "a", "an", or "a number of" can refer to one or more of something, and "a plurality of" can refer to two or more such things. For example, a memory device can refer to one or more memory devices, and a plurality of memory devices can refer to two or more memory devices.

The figures herein follow a numbering convention in which the first digit or digits correspond to the drawing figure number and the remaining digits identify an element or component in the drawing. Similar elements or components between different figures may be identified by the use of similar digits.

FIG. 1 is a block diagram of a system 100 for secure communication between a vehicle and a remote device in accordance with an embodiment of the present disclosure. For instance, as shown in FIG. 1, system 100 can include a vehicular apparatus (e.g., vehicle) 112, and a remote apparatus (e.g., remote device) 142. Remote apparatus 142 and vehicle 112 can communicate wirelessly with each other via wireless link 127, as illustrated in FIG. 1.

Vehicle 112 can be an autonomous or non-autonomous vehicle, such as, for example, a car, truck, or other type of vehicle that includes a lock (e.g., a locking mechanism, such as actuator). Remote device 142 can be a signaler for vehicle 112, such as, for instance, a key-fob, that can be used to lock and unlock the lock (e.g., door lock(s)) of vehicle 112, open the trunk of vehicle 112, and/or start the engine of vehicle 112, as will be further described herein. Although the examples described herein involve a vehicle, other systems, such as a garage door and garage door opener, could be used with the devices and techniques described herein.

As shown in FIG. 1, vehicle 112 can include a processing resource (e.g., processor) 114 coupled to a vehicular communication component 116, such as a reader, writer, transceiver, and/or other computing device or circuitry capable of performing the functions described below, that is coupled to (e.g., or includes) an antenna 119. Vehicular communication component 116 can include a processing resource 117 coupled to a memory 118, such as a non-volatile flash memory, although embodiments are not so limited. Memory 118 can include instructions executable by processing resources 114 and/or 117. In an embodiment, vehicular communication component 116 and/or processor 114 can be part of an on-board computer of vehicle 112.

As shown in FIG. 1, remote device 142 can include a processor 144 coupled to a remote communication component 146, such as a reader, writer, transceiver, and/or other computing device or circuitry capable of performing the functions described below, that is coupled to (e.g., or includes) an antenna 149. Remote communication component 146 can include a processing resource 147 coupled to a memory 148, such as a non-volatile flash memory, although embodiments are not so limited. Memory 148 can include instructions executable by processing resources 144 and/or 147.

Antenna 149 of remote device 142 can be in communication with (e.g., communicatively coupled to) antenna 119 of vehicle 112 via wireless link 127. In an example, remote device 142 and/or vehicle 112 can include a number of wireless communication devices, such as transmitters, transponders, transceivers, or the like. As an example, the remote communication component 146 and/or vehicular communication component can be such a wireless communication device. Wireless communication that can be used can include near field communication (NFC) tags, RFID tags, or the like. In an embodiment, wireless communication can be performed using non-volatile storage components that can be respectively integrated into chips, such as microchips. Each of the respective chips can be coupled to a respective antenna 149 and 119.

As shown in FIG. 1, vehicle 112 can include counters 120-1 and 120-2, and remote device 142 can include counter 123. Counters 120-1, 120-2, and/or 123 can be, for instance, monotonic counters.

Remote apparatus 142 (e.g., remote communication component 146) and vehicle 112 (e.g., vehicular communication component 116) can communicate securely with each other via wireless link 127. For example, remote communication component 146 can provide (e.g., transmit), via wireless link 127, a request to vehicular communication component 116 to switch the state of a lock of vehicle 112 from a first state to a second state. For instance, the request may be to switch the state of the lock from locked to unlocked (e.g., to unlock the door(s) of vehicle 112 remotely). In an embodiment, the request may also include and/or be a request to switch the state of the engine of vehicle 112 from a first state to a second state. For instance, the request may be to switch the state of the engine from off to on (e.g., to start the engine of vehicle 112 remotely).

The request can include (e.g., a portion of the request can be) a vehicle identification number (VIN) identifier for vehicle 112. A "VIN identifier", as used herein, can be and/or include the VIN itself, a portion of the VIN, or an identifier derived from the VIN. For instance, the VIN identifier can enable vehicle 112 (e.g., vehicular communication component 116) to distinguish between a request directed at it and a request directed at another vehicle. Other identifications for vehicle 112 can also be used, such as, for instance, a serial number, registration tag, or other code uniquely identifying vehicle 112. In an example, the request may be an open (e.g., unencrypted) message. The request can also include a remote public key, a remote public identification, and a remote certificate generated by remote communication component 146, as will be further described herein.

In response to receiving the request, vehicular communication component 116 can calculate a challenge count for the request. The challenge count can be a variable number of exchanges between vehicular communication component 116 and remote communication component 146 that can be used to verify the authenticity of the request.

The challenge count can be above a threshold (e.g., there can be a minimum for the challenge count). Establishing a minimum for the challenge count can establish a baseline security for the exchanges between vehicular communication component 116 and remote communication component 146. Further, the challenge count can be below a second threshold (e.g., there can be a maximum for the challenge count), in order to balance security with efficiency.

In an example, the challenge count can be a random number. In such an example, a random number generator of, or accessible to, vehicular communication component 116 can be used to calculate the challenge count.

In an additional example, the challenge count can be a pseudo-random number. In such an example, counter 120-1 can be used to calculate the challenge count. For instance, the pseudo-random number can be generated using cryptographic hardware, including counter 120-1, that can be used to generate a message authentication code (MAC). For instance, the challenge count (e.g., pseudo-random number) can be calculated by selecting a portion of a MAC generated using a key, a portion of the request (e.g., the VIN), and counter 120-1. Counter 120-1 can be a secret, not shared outside of vehicular communication component 116, and used to seed the MAC, such that it is different each time it is generated. Thus, in an example, counter 120-1 increments each time a request to switch the state of the lock and/or engine of vehicle 112 is received.

In an example, the portion of the MAC used as the random number is selected by comparing bytes in the MAC to the threshold until a current byte being compared meets or exceeds the threshold. Thus, for example, byte 0 can be first compared to the minimum, and possible maximum, thresholds. If byte 0 meets the threshold(s), then the number represented by byte 0 is used as the pseudo-random number for the challenge count. If byte 0 does not meet the threshold(s), then byte 1 is tested. This process can continue until a suitable byte (e.g., one that meets the threshold(s)) is found in the MAC. Although a linear search is described here, any type of search through the bytes of the MAC can be used to find a suitable pseudo-random value to use as the challenge count.

Further, vehicular communication component 116 can generate a vehicular private key and a vehicular public key, and remote communication component 146 can generate a remote private key and a remote public key. For instance, remote communication component 146 can generate the remote private and public keys before providing the request, and vehicular communication component 116 can generate the vehicular private and public keys in response to receiving the request. Vehicular communication component 116 can generate the vehicular public key using a unique secret key for vehicle 112 that is stored in memory 118, and remote communication component 146 can generate the remote public key using a unique secret key for remote device 142 that is stored in memory 148. The unique secret keys for vehicle 112 and remote device 142 may be assigned, for instance, during the manufacture of vehicle 112 and remote device 142, respectively, by the manufacturer, and may not be visible to the end user of vehicle 112 or remote device 142 or shared with other devices. For instance, the unique secret key for vehicle 112 may remain in memory 118 (e.g., in a secure portion of memory 118), and the unique secret key for remote device 142 may remain in memory 148 (e.g., in a secure portion of memory 148). An example of the generation of the vehicular and remote public and private keys will be further described herein.

After the challenge count has been calculated, vehicular communication component 116 and remote communication component 146 can perform a number of verification iterations. For instance, the verification iterations can be repeated by vehicular communication component 116 and remote communication component 146 until the number of verification iterations meets or exceeds the challenge count, thereby indicating the request is authentic (e.g., valid), or until a failure condition is encountered, thereby indicating the request is not authentic. An anti-replay (e.g., freshness) value can be used to modify each iteration, changing with each iteration. This freshness value can be implemented as counter 120-2, which can be incremented with each iteration, as further described below.

For example, for each respective verification iteration, vehicular communication component 116 can generate a vehicular public identification, a vehicular certificate, and an anti-replay (e.g., freshness) value, and remote communication component 146 can generate a remote public identification, a remote certificate, and an anti-replay value. Vehicular communication component 116 can generate its anti-replay value, for instance, using counter 120-1, and remote communication component 146 can generate its anti-replay value, for instance, using counter 123. As an additional example, the anti-replay values may also include timestamps. For instance, vehicular communication component 116 can generate a timestamp using a clock present on board vehicle 112, such as, for instance, a GPS signal, and provide the timestamp to remote communication component 146, as will be further described herein, and the timestamp used by remote communication component 146 can be the last timestamp received from vehicular communication component 116. An example of the generation of the vehicular and remote public identifications and certificates will be further described herein.

Further, for each respective verification iteration, vehicular communication component 116 can generate a digital signature for vehicular communication component 116, and remote communication component 146 can generate a digital signature for remote communication component 146. The digital signature for vehicular communication component 116 can be generated using the vehicular private key, and the digital signature for remote communication component 146 can be generated using the remote private key. An example of the generation of the digital signatures will be further described herein.

The vehicular public key, as well as the vehicular public identification, vehicular certificate, anti-replay value (e.g., counter and/or timestamp), and digital signature generated by vehicular communication component 116 for each respective iteration, can be provided (e.g., transmitted), via wireless link 127, to remote communication component 146. Further, vehicular communication component 116 can provide, via wireless link 127, the current value of counter 120-2 corresponding to (e.g., for) that verification iteration. Vehicular communication component 116 can encrypt the current value of counter 120-2 using the remote public key generated by remote communication component 146, as will be further described herein.

For each respective verification iteration, remote communication component 146 can decrypt (e.g., attempt to decrypt) the counter value corresponding to that verification iteration using the remote private key generated by remote communication component 146, as will be further described herein. Further, for each respective verification iteration, remote communication component 146 can verify (e.g., attempt to verify) the identity of vehicular communication component 116. Remote communication component 146 can verify the identity of vehicular communication component 116, for instance, using the digital signature for vehicular communication component 116, which in turn can be verified using the vehicular public key that was generated using the unique secret key for vehicle 112.

If remote communication component 146 is unable to verify the identity of vehicular communication component 116, this may indicate that a failure condition has occurred, and that the request to switch the state of the lock and/or engine of vehicle 112 may not be authentic (e.g., may not have originated from remote communication component 146). As such, in response to such a failure condition, vehicular communication component 116 and remote communication component 146 may cease to perform any more verification iterations, and the state of the lock and/or engine of vehicle 112 may not be switched.

If, however, remote communication component 146 is able to both decrypt the counter value for the verification iteration and verify the identity of vehicular communication component 116, remote communication component 146 can generate and encrypt code for switching the state of the lock and/or engine of vehicle 112 from the first state to the second state, and provide the encrypted code to vehicular communication component 116 via wireless link 127. Remote communication component 146 can encrypt the code using the vehicular public key received from vehicular communication component 116, as will be further described herein. Remote communication component 146 can also provide, along with the encrypted code, the remote public key, as well as the remote public identification, remote certificate, anti-replay value (e.g., counter value and/or timestamp), and digital signature generated by remote communication component 146 for that iteration, to vehicular communication component 116.

For each respective verification iteration, vehicular component 116 can, upon receiving the encrypted code, the remote public key, the remote public identification, the remote certificate, the anti-replay value, and the digital signature generated by remote communication component 146 for that iteration, verify (e.g., attempt to verify) the identity of remote communication component 146. Vehicular communication component 116 can verify the identity of remote communication component 146, for instance, using the digital signature for remote communication component 146, which in turn can be verified using the remote public key that was generated using the unique secret key for remote device 142.

If vehicular communication component 116 is unable to verify the identity of remote communication component 146, this may indicate that a failure condition has occurred, and that the request to switch the state of the lock and/or engine of vehicle 112 may not be authentic. As such, in response to such a failure condition, vehicular communication component 116 and remote communication component 146 may cease to perform any more verification iterations, and the state of the lock and/or engine of vehicle 112 may not be switched.

If, however, vehicular communication component 116 is able to verify the identity of remote communication component 146, vehicular communication component 116 can increment (e.g., increase the value of) counter 120-2. If the value of counter 120-2 is (e.g., remains) less than the challenge count after being incremented, vehicular communication component 116 and remote communication component 146 can perform the next verification iteration. If, however, the value of counter 120-2 is incremented to a value equal to or greater than the challenge count, vehicular communication component 116 can decrypt the code for switching the state of the lock received from the remote communication component 146 using the vehicular private key, and switch the state of the lock and/or engine of vehicle 112 from the first state to the second state. For instance, vehicular communication component 116 can unlock the door(s) of vehicle 112 using (e.g., by activating and/or actuating) the locking mechanism of the vehicle.

In an embodiment, vehicular communication component 116 may receive a request from the remote communication component of an additional (e.g., new) remote device to pair (e.g., couple) the additional remote device with vehicle 112. The request may be received, for instance, when the additional remote device is in close proximity to vehicle 112, via a short range (e.g., near-field) communication method such as, for instance, RFID or Bluetooth, among others.

In such an embodiment, vehicular communication component 116 can, in response to receiving the request, generate a vehicular public key, a vehicular public identification, and a vehicular certificate. Vehicular communication component 116 can generate the vehicular public key, vehicular public identification, and vehicular certificate in a manner analogous to that previously described herein (e.g., the vehicular public key can be generated using the unique secret key for vehicle 112). Vehicular communication component 116 can then provide (e.g., transmit), via the short range communication method, the vehicular public key, vehicular public identification, and vehicular certificate, to the remote communication component of the additional remote device.

Upon receiving the vehicular public key, vehicular public identification, and vehicular certificate, the remote communication component of the additional remote device can generate a remote public key, a remote public identification, and a remote certificate, in a manner analogous to that previously described herein (e.g., the remote public key can be generated using a unique secret key for the additional remote device). The remote communication component of the additional remote device can then provide, via the short range communication method, the remote public key, remote public identification, and remote certificate, to the vehicular communication component 116. Vehicular communication component 116 can verify (e.g., attempt to verify) the identity of the remote communication component of the additional remote device using the remote public key, remote public identification, and remote certificate, and pair with the remote communication component of the additional remote device in response to verifying its identity. Once paired, vehicular communication component 116 can receive a request from the additional remote device to switch the state of the lock of vehicle 112, calculate a challenge count, and perform verification iterations for the request with the remote communication component of the additional remote device, in a manner analogous to that previously described herein.

Figure 2:
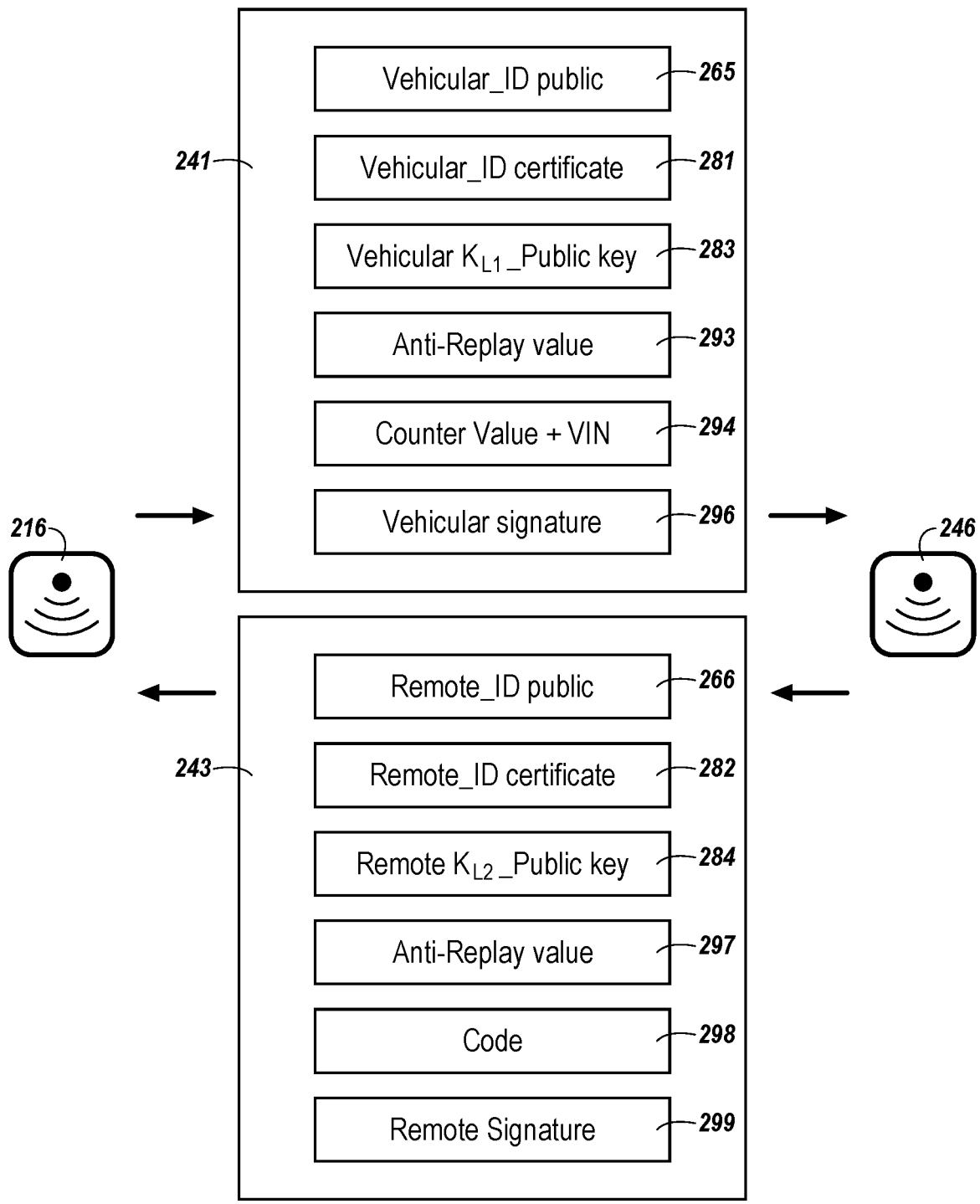
FIG. 2 is an illustration of an exchange of authentication data between a vehicular communication component and a remote communication component in accordance with an embodiment of the present disclosure.

FIG. 2 is an illustration of an exchange of authentication data 241 and 243 between a vehicular communication component 216 and a remote communication component 246 in accordance with an embodiment of the present disclosure. Vehicular communication component 216 and remote communication component 246 can be, for instance, vehicular communication component 116 and remote communication component 146, respectively, previously described in connection with FIG. 1.

Authentication data (e.g., packets) 241 and 243 can be exchanged between vehicular communication component 216 and remote communication component 246 during the performance of a verification iteration previously described in connection with FIG. 1. For instance, authentication packets 241 and 243 can be used to continue the verification iterations, with packet 241 transmitted from vehicular communication component 216 to remote communication component 246, and packet 243 transmitted from remote communication component 246 to vehicular communication component 216.

For example, as shown in FIG. 2, authentication data 241 transmitted by vehicular communication component 216 to remote communication component 246 can include a vehicular public identification (Vehicular ID public) 265, a vehicular certificate (Vehicular ID certificate) 281, a vehicular public key (Vehicular $K_{L1}$_Public key) 283, an anti-replay (e.g., freshness) value 293, a counter value (Counter Value+VIN) 294, and a vehicular signature 296. In an embodiment, one or more of fields 265, 281, 283, 293, 294, and 296 can be encrypted to further increase the security of the communications.

The vehicular public identification 265 can be used to determine the identity of vehicular communication component 216, and the vehicular certificate 281 can be used to verify that the identity of the vehicular communication component 216 is authenticated. The vehicular public key 283 can be used to encrypt data to be sent to the vehicular communication component 216 in order for the vehicular communication component 216 to decrypt the received data using its own private key, as will be described further herein.

Anti-replay value 293 can be generated using counter 120-1 and/or can include a timestamp as previously described in connection with FIG. 1, and counter value 294 can be the current value of counter 120-2 previously described in connection with FIG. 1 for the verification iteration. Further, a unique identity of the vehicle, such as a VIN or other identifying data, can be included with the counter value 294, as illustrated in FIG. 2. This value 294 may be referred to herein as a payload value.

Vehicular signature 296 can be used to verify that the data is sent from an authorized entity such that data with this verifiable signature is from the sender that vehicular communication component 216 is claiming to be. Vehicular signature 296 can be generated by encrypting the signature using the vehicular private key (which is provided only to the vehicle), and can be decrypted using the publicly provided vehicular public key 283. A further description of the signature verification will be further described herein.

Further, as shown in FIG. 2, authentication data 243 transmitted by remote communication component 246 to vehicular communication component 216 can include a remote public identification (Remote_ID public) 266, a remote certificate (Remote_ID certificate) 282, a remote public key (Remote $K_{L2}$_Public key) 284, an anti-replay (e.g., freshness) value 297, code 298, and a remote signature 299. In an embodiment, one or more of fields 266, 282, 284, 297, 298, and 299 can be encrypted to further increase the security of the communications.

The remote public identification 266 can be used to determine the identity of remote communication component 246, and the remote certificate 282 can be used to verify that the identity of the remote communication component 246 is authenticated. The remote public key 284 can be used to encrypt data to be sent to the remote communication component 246 in order for the remote communication component 246 to decrypt the received data using its own private key, as will be described further herein.

Anti-replay value 297 can be generated using counter 123 and/or can include a timestamp previously described in connection with FIG. 1. Code 298 can be code for switching the state of the lock and/or engine of the vehicle from a first state to a second state, as previously described herein.

Remote signature 299 can be used to verify that the data is sent from an authorized entity such that data with this verifiable signature is from the sender that remote communication component 246 is claiming to be. Remote signature 299 can be generated by encrypting the signature using the remote private key (which is provided only to the remote), and can be decrypted using the publicly provided remote public key 284. A further description of the signature verification will be further described herein.

Public keys 283 and 284 can be used to encrypt data sent to each respective communication component 216 and 246, and verify the identity of each communication component. As an example, and as will be further described below, vehicular communication component 216 can encrypt data (e.g., counter value 294) using remote public key 284, and send the encrypted data to remote communication component 246. Likewise, remote communication component 246 can encrypt data (e.g., code 298) using vehicular public key 283, and send the encrypted data to vehicular communication component 216.

Figure 3:
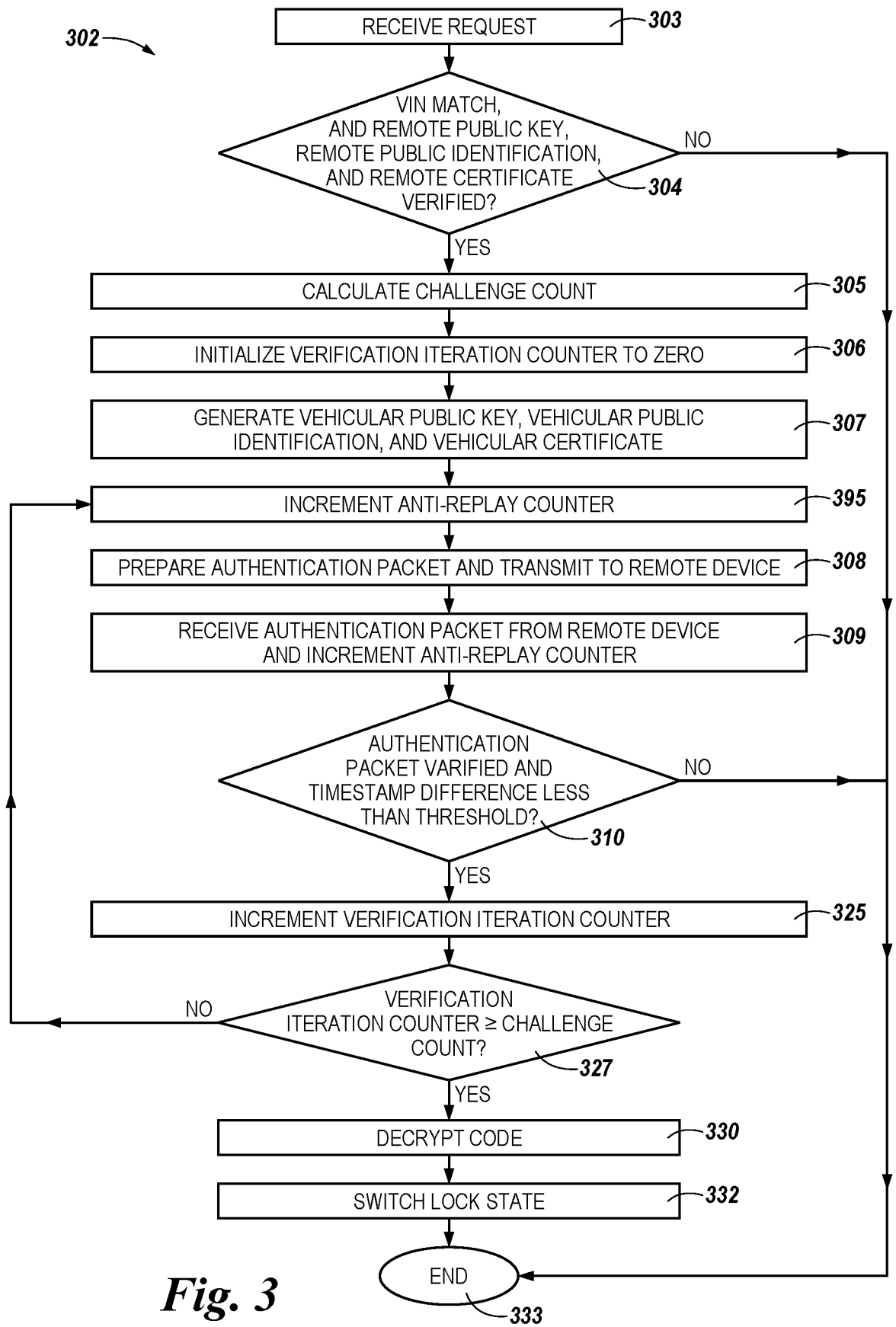
FIG. 3 illustrates a method for secure communication between a vehicle and a remote device in accordance with an embodiment of the present disclosure.

FIG. 3 illustrates a method 302 for secure communication between a vehicle and a remote device in accordance with an embodiment of the present disclosure. The vehicle and remote device can be, for instance, vehicle 112 and remote device 142, respectively, previously described in connection with FIG. 1, and method 302 can be performed by vehicle 112 (e.g., vehicular communication component 116) as previously described in connection with FIG. 1.

At block 303, method 302 includes receiving, from the remote device, a request to switch the state of a lock of the vehicle from a first state (e.g., locked) to a second state (e.g., unlocked). The request can include a VIN identifier, as previously described herein. The request can also include a remote public key, a remote public identification, and a remote certificate, as previously described herein.

At block 304, method 302 includes verifying (e.g., attempting to verify) the remote public key, remote public identification, and remote certificate, and determining whether the VIN identifier included in the request matches the VIN identifier for the vehicle. The verification can include, for instance, determining whether the remote public key, remote public identification, and remote certificate match their respective expected values, and can be performed using a DICE-RIOT protocol, and will be further described in connection with FIG. 6. Further, the vehicle can compare the VIN identifier included in the request to its own VIN. If the VIN identifier included in the request does not match the VIN identifier for the vehicle, or if the remote public key, remote public identification, and remote certificate are unable to be successfully verified, the request may not be for the vehicle and/or may not be authentic, and method 302 ends at block 333. If the VIN identifier included in the request matches the VIN identifier for the vehicle and the remote public key, remote public identification, and remote certificate are successfully verified, method 302 proceeds to block 305.

At block 305, method 302 includes calculating a challenge count for the request. The challenge count can be a variable number of exchanges between the vehicle and remote device that can be used to verify the authenticity of the request, as previously described in connection with FIG. 1, and can be calculated in a manner analogous to that previously described in connection with FIG. 1.

At block 306, method 302 includes initializing a verification iteration counter to zero. The verification iteration counter can be, for instance, counter 120-2 previously described in connection with FIG. 1.

At block 307, method 302 includes generating a vehicular public key, a vehicular public identification, and a vehicular certificate. The vehicular public key can be, for instance, vehicular public key 283 previously described in connection with FIG. 2, and can be generated using a unique secret key for the vehicle, as previously described in connection with FIG. 1. Further, although not shown in FIG. 3, a vehicular private key can also be generated, as previously described herein. The generation of the vehicular public key, vehicular public identification, and vehicular certificate will also further be described herein (e.g., in connection with FIG. 6).

At block 395, method 302 includes incrementing the anti-replay counter of the vehicle (e.g., counter 120-1 previously described in connection with FIG. 1). At block 308, method 302 includes preparing an authentication packet, and transmitting the authentication packet to the remote device. The authentication packet can include the vehicular public key, vehicular public identification, and vehicular certificate generated at block 307, as well as the value of the verification iteration counter and an anti-replay value. The authentication packet can be, for instance, packet 241 previously described in connection with FIG. 2. For instance, the vehicular public key, vehicular public identification, vehicular certificate, verification iteration counter value, and anti-replay value can be, for instance, vehicular public key 283, vehicular public identification 265, vehicular certificate 281, counter value 294, and anti-replay value 293, respectively, previously described in connection with FIG. 2. The verification iteration counter value can include the value of counter 120-2 and VIN of the vehicle, and the anti-replay value can include the value of counter 120-1 and/or a timestamp, as previously described herein. Further, the verification iteration counter value may be encrypted, as previously described herein.

At block 309, method 302 includes receiving, from the remote device, an authentication packet. The authentication packet can include a remote public key, a remote public identification, a remote certificate, an anti-replay value, code for switching the state of the lock of the vehicle from the first state to the second state, and a digital signature for the remote device. The authentication packet can be, for instance, packet 243 previously described in connection with FIG. 2. For instance, the remote public key, remote public identification, and remote certificate can be remote public key 284, remote public identification 266, and remote certificate 282, respectively, previously descried in connection with FIG. 2. Further, the anti-replay value can be, for instance, anti-replay value 297 previously described in connection with FIG. 2. The code can be, for instance, code 298 previously described in connection with FIG. 2, and may be encrypted, as previously described in connection with FIG. 1. The digital signature can be, for instance, signature 299 previously described in connection with FIG. 2. Further, the anti-replay counter of the vehicle (e.g., counter 120-1 previously described in connection with FIG. 1) can be incremented at block 309.

At block 310, method 302 includes verifying (e.g., attempting to verify) the authentication packet (e.g., the data included in the authentication packet) received from the remote device. For instance, block 310 can include verifying the anti-replay value, and verifying the digital signature for the remote device. The digital signature for the remote device can be verified using the remote public key, as previously described herein. If the anti-replay value includes a timestamp, the verification of the anti-replay value can include determining whether the timestamp matches the previous timestamp transmitted from the vehicle to the remote device. If the anti-replay value includes a counter value (e.g., the value of counter 123), the verification of the anti-replay value can include determining whether that counter value is the previous value of that counter incremented by one. Further, block 310 can include determining whether the difference between the current timestamp of the vehicle and the previous timestamp is less than a threshold amount of time, such as, for instance, 10 or 20 milliseconds. If the anti-replay value and/or the digital signature are unable to be successfully verified, or if the timestamp difference is not less than the threshold, the request to switch the state of the lock of the vehicle may not be authentic, and method 302 ends at block 333. If the anti-replay value and digital signature are successfully verified, and the timestamp difference is less than the threshold, method 302 proceeds to block 325.

At block 325, method 302 includes incrementing (e.g., increasing) the value of the verification iteration counter by one. At block 327, method 302 includes determining whether the value (e.g., the incremented value) of the verification iteration counter is greater than or equal to the challenge count. If the value of the verification iteration counter is not greater than or equal to the challenge count, method 302 returns to block 395 (e.g., for the next verification iteration). If the value of the verification iteration counter is greater than or equal to the challenge count, method 302 proceeds to block 330.

At block 330, method 302 includes decrypting the code for switching the state of the lock of the vehicle from the first state to the second state. The code can be decrypted using the vehicular private key, as previously described in connection with FIG. 1.

At block 332, method 302 includes switching the state of the lock from the first state to the second state. As an example, the code can be considered a command to be executed by the vehicle. For instance, the vehicle can execute a command to unlock the door(s) of the vehicle using the locking mechanism of the vehicle, as previously described in connection with FIG. 1. Method 302 then ends at block 333.

Figure 4:
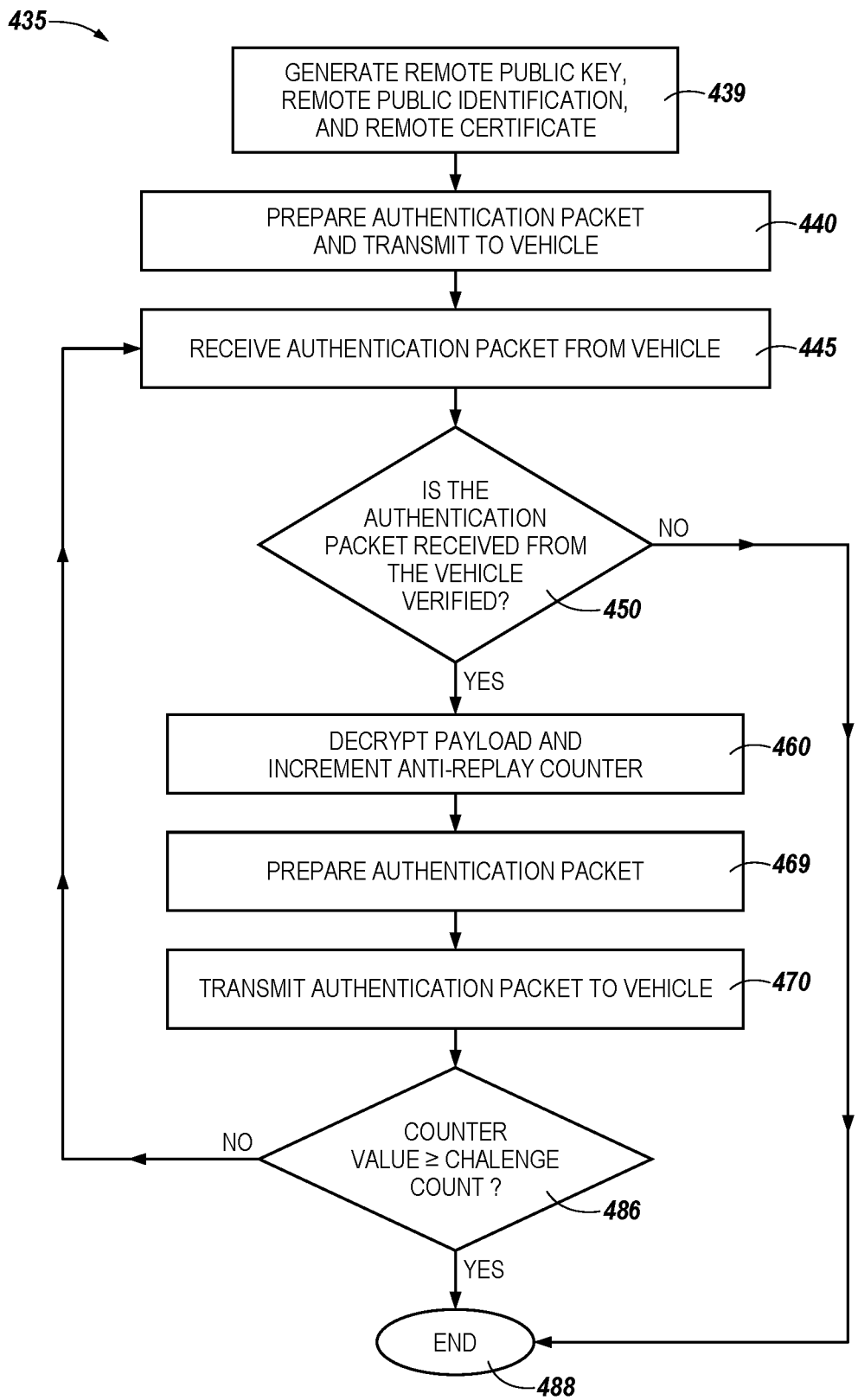
FIG. 4 illustrates a method for secure communication between a vehicle and a remote device in accordance with an embodiment of the present disclosure.

FIG. 4 illustrates a method 435 for secure communication between a vehicle and a remote device in accordance with an embodiment of the present disclosure. The vehicle and remote device can be, for instance, vehicle 112 and remote device 142, respectively, previously described in connection with FIG. 1, and method 435 can be performed by remote device 142 (e.g., remote communication component 146) as previously described in connection with FIG. 1.

At block 439, method 435 includes generating a remote public key, a remote public identification, and a remote certificate. The remote public key can be, for instance, remote public key 284 previously described in connection with FIG. 2, and can be generated using a unique secret key for the remote device, as previously described in connection with FIG. 1. Further, although not shown in FIG. 4, a remote private key can also be generated, as previously described herein. The generation of the remote public key, remote public identification, and remote certificate will also further be described herein (e.g., in connection with FIG. 6).

At block 440, method 435 includes preparing an authentication packet, and transmitting the authentication packet to the vehicle. The authentication packet can include the remote public key, the remote public identification, and the remote certificate. The authentication packet can also include a remote signature, and code for switching the state of the lock and/or engine of the vehicle from a first state to a second state. The authentication packet can be, for instance, packet 243 previously described in connection with FIG. 2. For instance, the remote public key, remote public identification, remote certificate, remote signature, and code can be, for instance, remote public key 284, remote public identification 266, remote certificate 282, remote signature 299, and code 298, respectively, previously described in connection with FIG. 2. Further, the code may be encrypted, as previously described herein.

At block 445, method 435 includes receiving, from the vehicle, an authentication packet. The authentication packet can include a vehicular public key, a vehicular public identification, a vehicular certificate, a verification iteration counter value, and a digital signature for the vehicle. The authentication packet can be, for instance, packet 241 previously described in connection with FIG. 2. For instance, the vehicular public key, vehicular public identification, and vehicular certificate can be vehicular public key 283, vehicular public identification 265, and vehicular certificate 281, respectively, previously described in connection with FIG. 2. The verification iteration counter value can be, for instance, counter value (e.g., payload) 294 previously described in connection with FIG. 2, and may be encrypted, as previously described in connection with FIG. 1. The digital signature can be, for instance, signature 296 previously described in connection with FIG. 2.

At block 450, method 435 includes verifying (e.g., attempting to verify) the authentication packet (e.g., the data included in the authentication packet) received from the vehicle. For instance, block 450 can include verifying the VIN, verifying the vehicular public key, vehicular public identification, and vehicular certificate, verifying the anti-replay value, and verifying the digital signature for the vehicle. This verification can include, for instance, determining whether the VIN, vehicular public key, vehicular public identification, vehicular certificate, anti-replay value, and digital signature match their respective expected values. The verification of the vehicular public key, vehicular public identification, and vehicular certificate can be performed using a DICE-RIOT protocol, and will be further described in connection with FIG. 8. The digital signature for the vehicle can be verified using the vehicular public key, as previously described herein. If the authentication packet is unable to be successfully verified, method 435 ends at block 488. If the authentication packet is successfully verified, method 435 proceeds to block 460.

At block 460, method 435 includes decrypting the payload (e.g., the verification iteration counter value and VIN). The payload can be decrypted using the remote private key, as previously described in connection with FIG. 1. Further, if the remote device includes an anti-replay counter (e.g., counter 123 previously described in connection with FIG. 1), that counter can be incremented at block 460.

At block 469, method 435 includes preparing an authentication packet using the remote public key generated at block 449, and the authentication packet is transmitted to the vehicle at block 470. The authentication packet can include a remote signature, code for switching the state of the lock and/or engine of the vehicle from a first state to a second state, and an anti-replay value. The authentication packet can be, for instance, packet 243 previously described in connection with FIG. 2. For instance, the remote signature, code, and anti-replay value can be, for instance, remote signature 299, code 298, and anti-replay value 297, respectively, previously described in connection with FIG. 2. The anti-replay value can include the value of counter 123 and/or the timestamp received from the vehicle, as previously described herein. Further, the code may be encrypted, as previously described herein.

At block 486, method 302 includes determining whether the verification iteration counter value is greater than or equal to the challenge count calculated by the vehicle. If the value of the verification iteration counter is not greater than or equal to the challenge count, method 435 returns to block 445 (e.g., for the next verification iteration). If the value of the verification iteration counter is greater than or equal to the challenge count, method 435 ends at block 488.

Figure 5:
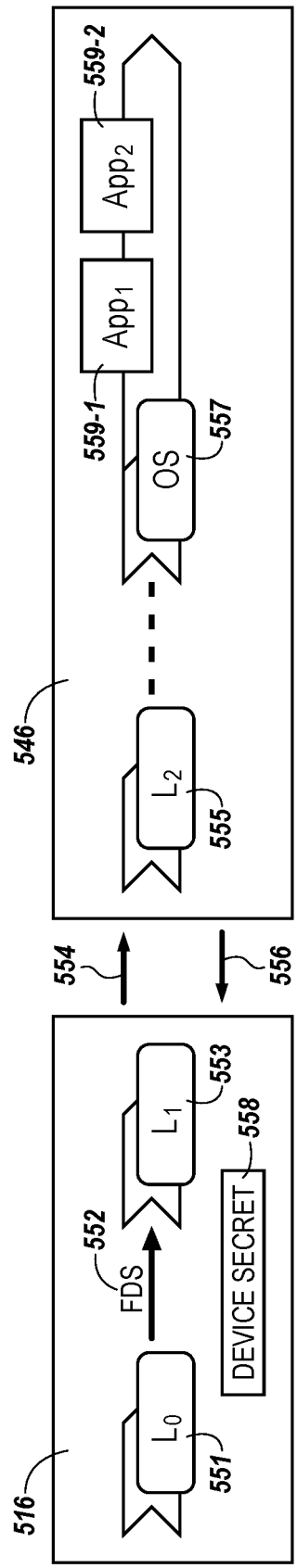
FIG. 5 is a block diagram of an example system including a vehicular communication component and a remote communication component in accordance with an embodiment of the present disclosure.

FIG. 5 is a block diagram of an example system including a vehicular communication component 516 and a remote communication component 546 in accordance with an embodiment of the present disclosure. Vehicular communication component 516 and remote communication component 546 can be, for example, vehicular communication component 116 and remote communication component 146 previously described in connection with FIG. 1.

A computing device can boot in stages using layers, with each layer authenticating and loading a subsequent layer and providing increasingly sophisticated runtime services at each layer. A layer can be served by a prior layer and serve a subsequent layer, thereby creating an interconnected web of the layers that builds upon lower layers and serves higher order layers. As is illustrated in FIG. 5, Layer 0 ("L₀") 551 and Layer 1 ("L₁") 553 are within the vehicular communication component 516. Layer 0 551 can provide a Firmware Derivative Secret (FDS) key 552 to Layer 1 553. The FDS key 552 can describe the identity of code of Layer 1 553 and other security relevant data. In an example, a particular protocol (such as robust internet of things (RIOT) core protocol) can use the FDS 552 to validate code of Layer 1 553 that it loads. In an example, the particular protocol can include a device identification composition engine (DICE) and/or the RIOT core protocol. As an example, an FDS can include Layer 1 firmware image itself, a manifest that cryptographically identifies authorized Layer 1 firmware, a firmware version number of signed firmware in the context of a secure boot implementation, and/or security-critical configuration settings for the device. A device secret 558 can be used to create the FDS 552 and be stored in memory of the vehicular communication component 516, such that FDS 552 is unique to vehicular communication component 516.

The vehicular communication component 516 can transmit data, as illustrated by arrow 554, to the remote communication component 546. The transmitted data can include an vehicular identification that is public (e.g., 265 in FIG. 2), a certificate (e.g., a vehicular identification certificate 281), and/or a vehicular public key (e.g., 283). Layer 2 ("L$_2$") 555 of the remote communication component 546 can receive the transmitted data and execute the data in operations of the operating system ("OS") 557 and on a first application 559-1 and a second application 559-2.

In an example operation, the vehicular communication component 516 can read the device secret 558, hash an identity of Layer 1 553, and perform a calculation including:

$$K_{L1}=KDF[Fs(s),\text{Hash}(\text{"immutable information"})]$$

where $K_{L1}$ is a vehicular public key, KDF (e.g., KDF defined in the National Institute of Standards and Technology (NIST) Special Publication 800-108) is a key derivation function (e.g., HMAC-SHA256), and Fs(s) is the device secret 558. FDS 552 can be determined by performing:

$$FDS=\text{HMAC-SHA256}[Fs(s),\text{SHA256}(\text{"immutable information"})]$$

Likewise, the remote communication component 546 can transmit data, as illustrated by arrow 556, including a remote identification that is public (e.g., remote public identification 266), a certificate (e.g., a remote identification certificate 282), and/or a remote public key (e.g., public key 284).

Figure 6:
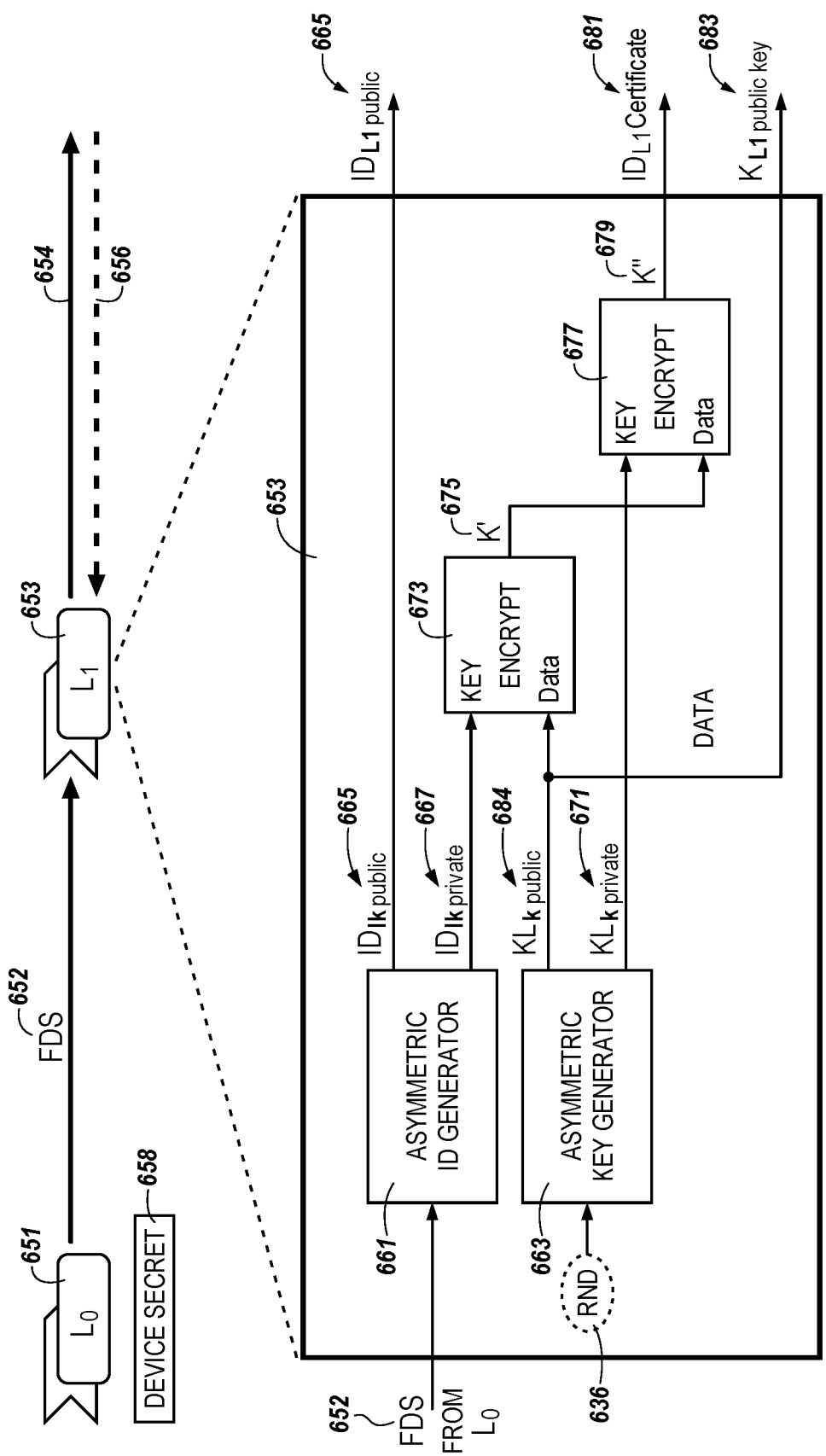
FIG. 6 is a block diagram of an example process to determine a number of parameters in accordance with an embodiment of the present disclosure.

FIG. 6 is a block diagram of an example process to determine a number of parameters in accordance with an embodiment of the present disclosure. FIG. 6 is an example of a determination of the parameters including the vehicular public identification, the vehicular certificate, and the vehicular public key that are then sent, indicated by arrow 654, to Layer 2 (e.g., Layer 2 555) of a remote communication component (e.g., 546 in FIG. 5). Layer 0 ("L$_0$") 651 in FIG. 6 corresponds to Layer 0 551 in FIG. 5 and likewise FDS 652 corresponds to FDS 552, Layer 1 653 corresponds to Layer 1 553, and arrows 654 and 656 correspond to arrows 554 and 556, respectively.

The FDS 652 from Layer 0 651 is sent to Layer 1 653 and used by an asymmetric ID generator 661 to generate a public identification ("ID$_{lk\ public}$") 665 and a private identification 667. In the abbreviated "ID$_{lk\ public}$," the "lk" indicates Layer k (in this example Layer 1), and the "public" indicates that the identification is openly shared. The public identification ("ID$_{L1public}$") 665 is illustrated as shared by the arrow extending to the right and outside of Layer 1 653 of the external communication component. The generated private identification 667 is used as a key input into an encryptor 673. The encryptor 673 can be any processor, computing device, etc. used to encrypt data.

Layer 1 653 of a vehicular communication component can include an asymmetric key generator 663. In at least one example, a random number generator (RND) 636 can optionally input a random number into the asymmetric key generator 663. The asymmetric key generator 663 can generate a public key ("K$_{Lk}$ public") 683 (referred to as a vehicular public key) and a private key ("K$_{LK\ private}$") 671 (referred to as a vehicular private key) associated with a vehicular communication component such as vehicular communication component 516 in FIG. 5. The vehicular public key 683 can be an input (as "data") into the encryptor 673. The encryptor 673 can generate a result K'675 using the inputs of the vehicular private identification 667 and the vehicular public key 683. The vehicular private key 671 and the result K'675 can be input into an additional encryptor 677, resulting in output K" 679. The output K" 679 is the vehicular certificate ("ID$_{L1}$ certificate") 681 transmitted to the Layer 2 (555 of FIG. 5). The vehicular certificate 681 can provide an ability to verify and/or authenticate an origin of data sent from the vehicular communication component. As an example, data sent from the vehicular communication component can be associated with an identity of the vehicular communication component by verifying the certificate, as will be described further in association with FIG. 8. Further, the vehicular public key ("K$_{L1\ public\ key}$") 683 can be transmitted to Layer 2. Therefore, the public identification 665, the certificate 681, and the public key 683 of a Layer 1 653 of a vehicular communication component can be transmitted to Layer 2 of a remote communication component.

Figure 7:
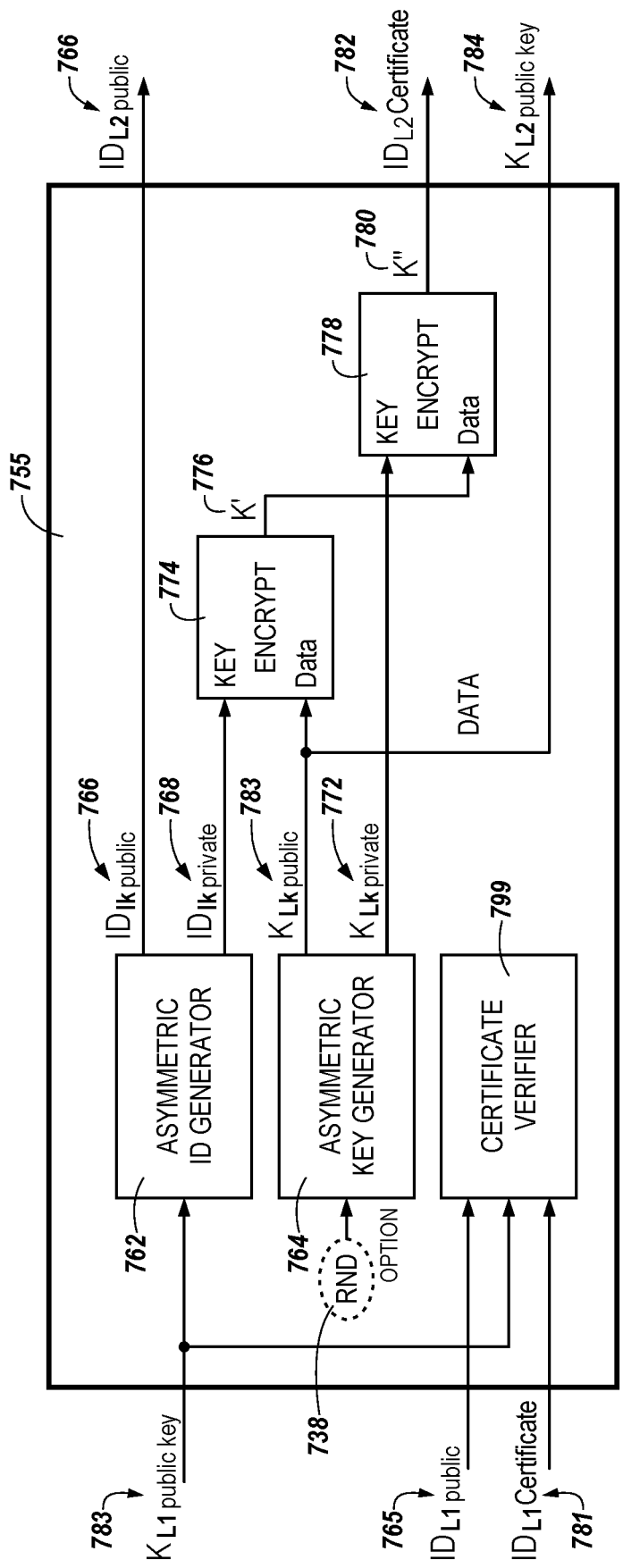
FIG. 7 is a block diagram of an example process to determine a number of parameters in accordance with an embodiment of the present disclosure.

FIG. 7 is a block diagram of an example process to determine a number of parameters in accordance with an embodiment of the present disclosure. FIG. 7 illustrates a Layer 2 755 of an remote communication component (e.g., remote communication component 546 in FIG. 5) generating an remote identification ("ID$_{L2\ public}$") 766, an remote certificate ("ID$_{L2\ Certificate}$") 782, and a remote public key ("K$_{L2\ public\ key}$") 784.

The vehicular public key ("K$_{L1\ public\ key}$") 784 transmitted from Layer 1 of the vehicular communication component to Layer 2 755 of a remote communication component, as described in FIG. 6, is used by an asymmetric ID generator 762 of the remote communication component to generate a public identification ("ID$_{lk\ public}$") 766 and a private identification 768 of the remote communication component. In the abbreviated "ID$_{lk\ public}$," the "lk" indicates Layer k (in this example Layer 2), and the "public" indicates that the identification is openly shared. The public identification 766 is illustrated as shared by the arrow extending to the right and outside Layer 2 755. The generated private identification 768 is used as a key input into an encryptor 774.

As shown in FIG. 7, the vehicular certificate 782 and public identification 766, along with the vehicular public key 784, are used by a certificate verifier 799. The certificate verifier 799 can verify the vehicular certificate 782 received from the vehicular communication component, and determine, in response to the vehicular certificate 782 being verified or not being verified, whether to accept or discard data received from the vehicular communication component. Further details of verifying a remote certificate 782 are further described herein (e.g., in connection with FIG. 9).

Layer 2 755 of the remote communication component can include an asymmetric key generator 764. In at least one example, a random number generator (RND) 638 can optionally input a random number into the asymmetric key generator 764. The asymmetric key generator 764 can generate a public key ("K$_{Lk}$ public") 784 (referred to as a remote public key) and a private key ("K$_{LK\ private}$") 772 (referred to as a remote private key) associated with a remote communication component such as remote communication component 546 in FIG. 5. The remote public key 784 can be an input (as "data") into the encryptor 774. The encryptor 774 can generate a result K' 776 using the inputs of the remote private identification 768 and the remote public key 784. The remote private key 772 and the result K' 776 can be input into an additional encryptor 778, resulting in output K" 780. The output K" 780 is the remote certificate ("ID$_{L2}$ certificate") 782 transmitted back to the Layer 1 (553 of FIG. 5). The remote certificate 782 can provide an ability to verify and/or authenticate an origin of data sent from the remote communication component. As an example, data sent from the remote communication component can be associated with an identity of the remote communication component by verifying the certificate, as will be described further in association with FIG. 8. Further, the remote public key ("K$_{L2\ public\ key}$") 784 can be transmitted to Layer 1. Therefore, the public identification 766, the certificate 782, and the remote public key 784 of the remote communication component can be transmitted to Layer 1 of a vehicular communication component.

In an example, in response to a remote communication component receiving a public key from a vehicular communication component, the remote communication component can encrypt data to be sent to the vehicular communication component using the vehicular public key. Vice versa, the vehicular communication component can encrypt data to be sent to the remote communication component using the remote public key. In response to the remote communication component receiving data encrypted using the remote public key, the remote communication component can decrypt the data using its own remote private key. Likewise, in response to the vehicular communication component receiving data encrypted using the vehicular public key, the vehicular communication component can decrypt the data using its own vehicular private key. As the remote private key is not shared with another device outside the remote communication component and the vehicular private key is not shared with another device outside the vehicular communication component, the data sent to the remote communication component and the vehicular communication component remains secure.

Figure 8:
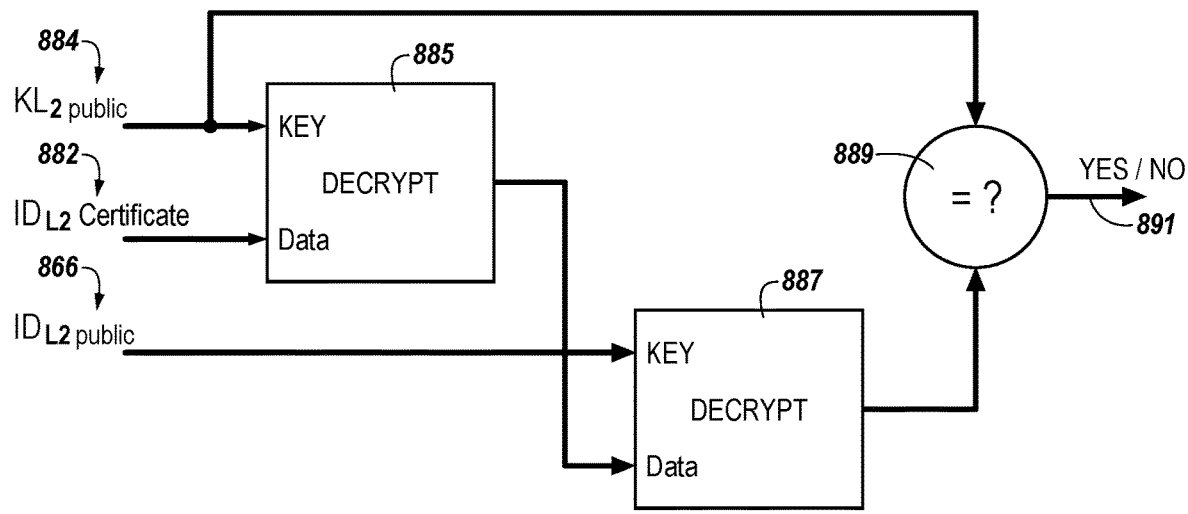
FIG. 8 is a block diagram of an example process to verify a certificate in accordance with an embodiment of the present disclosure.

FIG. 8 is a block diagram of an example process to verify a certificate in accordance with an embodiment of the present disclosure. In the illustrated example of FIG. 8, a public key 884, a certificate 882, and a public identification is provided from a remote communication component (e.g., from Layer 2 555 of remote communication component 546 in FIG. 5). The data of the certificate 882 and the remote public key 884 can be used as inputs into a decryptor 885. The decryptor 885 can be any processor, computing device, etc used to decrypt data. The result of the decryption of the certificate 882 and the remote public key 884 can be used as an input into a secondary decryptor 887 along with the public identification, result in an output. The remote public key 884 and the output from the decryptor 887 can indicate, as illustrated at 889, whether the certificate is verified, resulting in a yes or no 891 as an output. In response to the certificate being verified, data received from the device being verified can be accepted, decrypted, and processed. In response to the certificate not being verified, data received from the device being verified can be discarded, removed, and/or ignored. In this way, nefarious devices sending nefarious data can be detected and avoided. As an example, a hacker sending data to be processed can be identified and the hacking data not processed.

Figure 9:
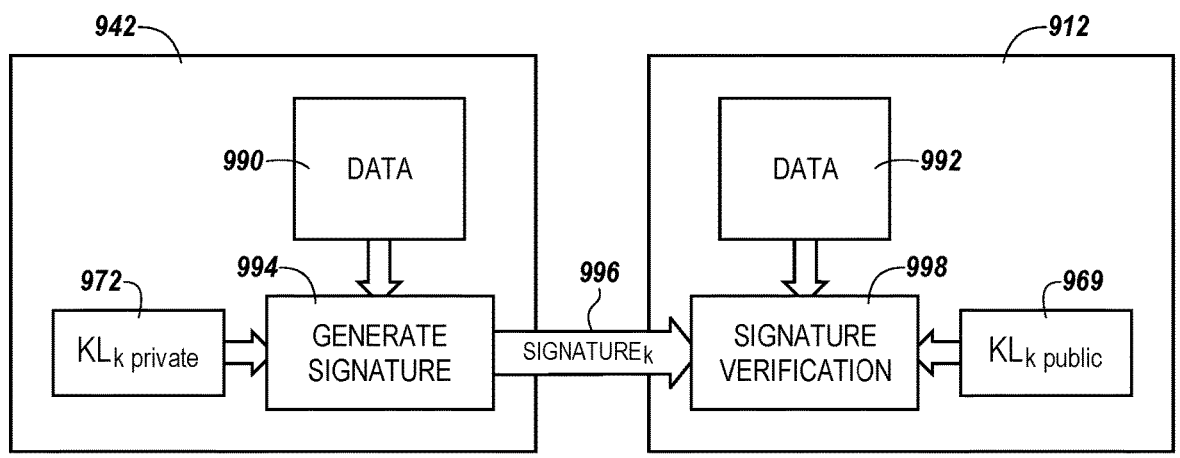
FIG. 9 is a block diagram of an example process to verify a signature an accordance with an embodiment of the present disclosure.

FIG. 9 is a block diagram of an example process to verify a signature in accordance with an embodiment of the present disclosure. In the instance where a device is sending data that may be verified in order to avoid subsequent repudiation, a signature can be generated and sent with data. As an example, a first device may make a request of a second device and once the second device performs the request, the first device may indicate that the first device never made such a request. An anti-repudiation approach, such as using a signature, can avoid repudiation by the first device and insure that the second device can perform the requested task without subsequent difficulty.

A remote device 942 (such as remote device 142 in FIG. 1) can send data 990 to a vehicle 912 (such as vehicle 112). The remote device 942 can generate, at 994, a signature 996 using a remote private key 972. The signature 996 can be transmitted to the vehicle 912. The vehicle 912 can verify, at 998, using data 992 and the vehicle public key 969. In this way, signature verification operates by using a private key to encrypt the signature and a public key to decrypt the signature. In this way, the private key used to generate a unique signature can remain private to the device sending the signature while allowing the receiving device to be able to decrypt the signature using the public key of the sending device for verification. This is in contrast to encryption/decryption of the data, which is encrypted by the sending device using the public key of the receiving device and decrypted by the receiving device using the private key of the receiver. In at least one example, the vehicle can verify the digital signature by using an internal cryptography process (e.g., Elliptical Curve Digital signature (ECDSA) or a similar process.

Figure 10:
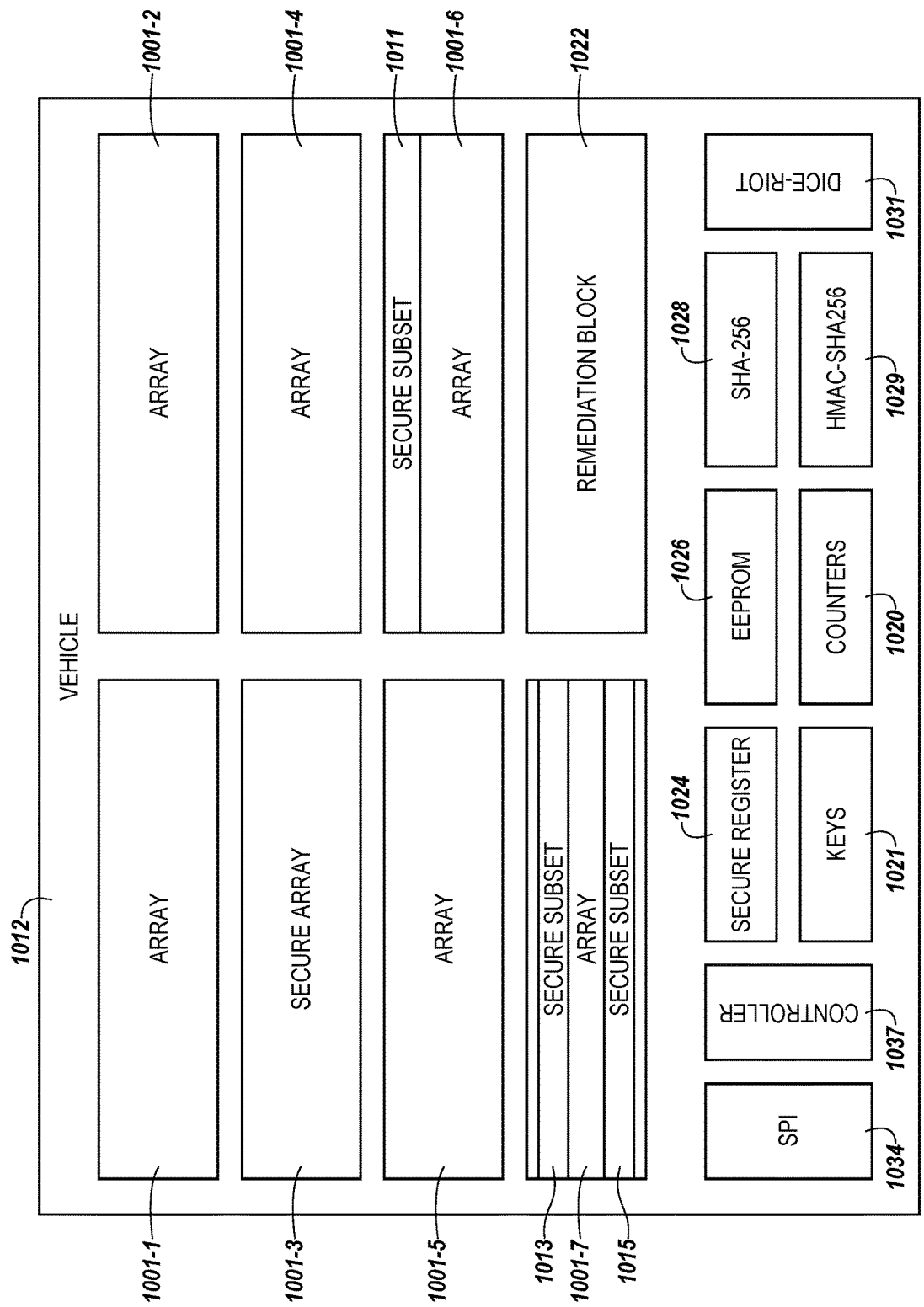
FIG. 10 is a block diagram of an example vehicular apparatus in accordance with an embodiment of the present disclosure.

FIG. 10 is a block diagram of an example vehicular apparatus (e.g., vehicle) 1012 in accordance with an embodiment of the present disclosure. Vehicle 1012 can be, for example, vehicle 112 previously described in connection with FIG. 1.

As shown in FIG. 10, vehicle 1012 can include a number of memory arrays 1001-1 through 1001-7. Further, in the example illustrated in FIG. 10, memory array 1001-3 is a secure array, subset 1011 of memory array 1001-6 comprises a secure array, and subsets 1013 and 1015 of memory array 1001-7 comprise a secure array. As used herein, a secure portion of a memory, such as, for instance, a secure array, can refer to an area of the memory to be kept under control, and/or an area of the memory that stores sensitive (e.g., non-user) data, such as host firmware and/or code to be executed for sensitive applications. Subsets 1011, 1013, and 1015 can each include, for instance, 4 kilobytes of data. However, embodiments of the present disclosure are not limited to a particular number or arrangement of memory arrays or secure arrays.

As shown in FIG. 10, vehicle 1012 can include a remediation (e.g., recovery) block 1022. Remediation block 1022 can be used as a source of data in case of errors (e.g., mismatches) that may occur during operation of vehicle 1012. Remediation block 1022 may be outside of the area of vehicle 1012 that is addressable by a host.

As shown in FIG. 10, vehicle 1012 can include a serial peripheral interface (SPI) 1034 and a controller 1037. Vehicle 1012 can use SPI 1034 and controller 1037 to communicate with a host and memory arrays 1001-1 through 1001-7.

As shown in FIG. 10, vehicle 1012 can include a secure register 1024 for managing the security of vehicle 1012. For example, secure register 1024 can configure, and communicate externally, to an application controller. Further, secure register 1024 may be modifiable by an authentication command.

As shown in FIG. 10, vehicle 1012 can include keys 1021. For instance, vehicle 1012 can include eight different slots to store keys such as the vehicular public and private keys previously described herein, root keys, DICE-RIOT keys, and/or other external session keys.

As shown in FIG. 10, vehicle 1012 can include an electronically erasable programmable read-only memory (EEPROM) 1026. EEPROM 1026 can provide a secure non-volatile area available for a host, in which individual bytes of data can be erased and programmed.

As shown in FIG. 10, vehicle 1012 can include counters (e.g., monotonic counters) 1020. Counters 1020 can be used as an anti-replay mechanism (e.g., freshness generator) for secure communications between vehicle 1012 and a remote device, as previously described herein. For instance, counters 1020 can include counters 120-1 and 120-2 previously described in connection with FIG. 1.

As shown in FIG. 10, vehicle 1012 can include an SHA-256 cryptographic hash function 1028, and/or an HMAC-SHA256 cryptographic hash function 1029. SHA-256 and/or HMAC-SHA256 cryptographic hash functions 1028 and 1029 can be used by vehicle 1012 to generate cryptographic hashes, such as, for instance, run-time cryptographic hashes as previously described herein, and/or golden hashes used to validate the data stored in memory arrays 1001-1 through 1001-7. Further, vehicle 1012 can support L0 and L1 of DICE-RIOT 1031.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
    a processing resource;
    memory having instructions executable by the processing resource; and
    a communication component coupled to the processing resource, wherein the communication component is configured to, in response to receiving a request from a remote communication component to switch a state of a lock of the apparatus from a first state to a second state:
        provide a key to the remote communication component;
        receive, from the remote communication component in response to providing the key to the remote communication component, code for switching the state of the lock from the first state to the second state;
        verify an identity of the remote communication component;
        increment a counter of the apparatus in response to verifying the identity of the remote communication component; and
        switch the state of the lock from the first state to the second state in response to the counter being incremented to a value equal to or greater than a threshold count.

2. The apparatus of claim 1, wherein the communication component is configured to calculate the threshold count.

3. The apparatus of claim 1, wherein the communication component is configured to generate the key.

4. The apparatus of claim 1, wherein the communication component is configured to decrypt the received code using an additional key.

5. The apparatus of claim 4, wherein the additional key is a private key.

6. The apparatus of claim 1, wherein the key is a public key.

7. The apparatus of claim 1, wherein the communication component is configured to, in response to the counter being incremented to a value less than the threshold count:
    provide an additional key to the remote communication component;
    receive, from the remote communication component in response to providing the additional key to the remote communication component, additional code for switching the state of the lock from the first state to the second state;
    verify the identity of the remote communication component;
    increment the counter of the apparatus in response to verifying the identity of the remote communication component; and
    switch the state of the lock from the first state to the second state in response to the counter being incremented to a value equal to or greater than the threshold count.

8. A method of operating an apparatus, comprising:
    receiving a request from a remote communication component to switch a state of a lock of the apparatus from a first state to a second state;
    generating a key in response to receiving the request;
    providing the key to the remote communication component;
    receiving, from the remote communication component in response to providing the key to the remote communication component, code for switching the state of the lock from the first state to the second state;
    verifying an identity of the remote communication component using a digital signature for the remote communication component;
    incrementing a counter of the apparatus in response to verifying the identity of the remote communication component; and
    switching the state of the lock from the first state to the second state in response to the counter being incremented to a value equal to or greater than a threshold count.

9. The method of claim 8, wherein the key is generated using a unique secret key for the apparatus.

10. The method of claim 8, wherein the digital signature is received from the remote communication component.

11. The method of claim 8, wherein the method includes:
    generating an anti-replay value in response to receiving the request;
    providing the anti-replay value to the remote communication component; and
    receiving the code from the remote communication component in response to providing the anti-replay value to the remote communication component.

12. The method of claim 8, wherein the method includes:
    generating a public identification for the apparatus in response to receiving the request;

providing the public identification for the apparatus to the remote communication component; and receiving the code from the remote communication component in response to providing the public identification for the apparatus to the remote communication component.

13. The method of claim 8, wherein the method includes:

generating a certificate for the apparatus in response to receiving the request;

providing the certificate for the apparatus to the remote communication component; and receiving the code from the remote communication component in response to providing the certificate for the apparatus to the remote communication component.

14. An apparatus, comprising:

a processing resource;

memory having instructions executable by the processing resource; and a communication component coupled to the processing resource, wherein the communication component is configured to:

provide a request to a communication component of an additional apparatus to switch a state of a lock of the additional apparatus from a first state to a second state;

receive, from the communication component of the additional apparatus in response to providing the request, a key;

verify an identity of the communication component of the additional apparatus;

encrypt code for switching the state of the lock of the additional apparatus from the first state to the second state using the key; and provide, in response to verifying the identity of the communication component of the additional apparatus, the encrypted code to the communication component of the additional apparatus for the communication component of the additional apparatus to:

verify an identity of the communication component of the apparatus using a digital signature for the communication component of the apparatus;

increment a counter of the additional apparatus in response to verifying the identity of the communication component of the apparatus; and switch the state of the lock from the first state to the second state in response to the counter being incremented to a value equal to or greater than a threshold count.

15. The apparatus of claim 14, wherein the communication component is configured to:

receive, from the communication component of the additional apparatus in response to providing the request, a counter value; and decrypt the counter value.

16. The apparatus of claim 15, wherein the communication component of the apparatus is configured to decrypt the counter value using an additional key.

17. The apparatus of claim 15, wherein the communication component of the apparatus is configured to provide the encrypted code to the communication component of the additional apparatus in response to decrypting the counter value.

18. The apparatus of claim 14, wherein the communication component of the apparatus is configured to:

generate an additional key; and provide the additional key to the communication component of the additional apparatus in response to verifying the identity of the communication component of the additional apparatus.

19. The apparatus of claim 14, wherein the communication component of the apparatus is configured to:

receive, from the communication component of the additional apparatus in response to providing the request, a digital signature for the communication component of the additional apparatus; and verify the identity of the communication component of the additional apparatus using the digital signature.

20. The apparatus of claim 14, wherein the apparatus is a remote device.

* * * * *